United States Patent [19]
Dreiman

[11] Patent Number: 5,342,179
[45] Date of Patent: Aug. 30, 1994

[54] COMPRESSOR SHOCK ABSORBING MOUNT ASSEMBLY

[75] Inventor: Nelik I. Dreiman, Tipton, Mich.

[73] Assignee: Tecumseh Products Company, Tecumseh, Mich.

[21] Appl. No.: 27,238

[22] Filed: Mar. 5, 1993

[51] Int. Cl.5 .............................................. F04B 35/04
[52] U.S. Cl. ...................................... 417/363; 417/902
[58] Field of Search ................................ 417/363, 902

[56] References Cited

U.S. PATENT DOCUMENTS

| | | | |
|---|---|---|---|
| 1,988,295 | 1/1935 | Berry | 248/16 |
| 2,069,767 | 2/1937 | McCormack | 230/24 |
| 3,030,056 | 4/1962 | Rogers | 248/20 |
| 3,065,901 | 11/1962 | Neubauer | 230/58 |
| 3,292,884 | 12/1966 | Scheldorf | 248/20 |
| 3,465,954 | 9/1969 | Ellis | 230/235 |
| 3,531,069 | 9/1970 | Dubberley | 248/15 |
| 3,540,813 | 11/1970 | Murphy | 417/363 |
| 3,578,279 | 5/1971 | Scheldorf | 248/20 |
| 3,814,357 | 6/1974 | Rontgen | 248/20 |
| 3,887,304 | 6/1975 | Otaki | 417/363 |
| 3,926,156 | 12/1975 | McCormick | 123/41 |
| 4,043,432 | 8/1977 | Scheldorf | 138/26 |
| 4,108,581 | 8/1978 | Miller et al. | 417/363 |
| 4,174,189 | 11/1979 | Elson | 417/363 |
| 4,200,426 | 4/1980 | Linnert | 417/363 X |
| 4,262,977 | 4/1981 | Bock | 308/26 |
| 4,549,859 | 10/1985 | Andrione | 417/363 |
| 4,871,300 | 10/1989 | Outzen | 417/363 |
| 4,891,955 | 1/1990 | Klausing | 62/295 |
| 5,090,657 | 2/1992 | Dreiman | 248/624 |

FOREIGN PATENT DOCUMENTS

| | | |
|---|---|---|
| 3-100386 | 4/1991 | Japan . |
| 3-105085 | 5/1991 | Japan . |
| 3-202693 | 9/1991 | Japan . |
| 4-36077 | 2/1992 | Japan . |

Primary Examiner—Richard E. Gluck
Attorney, Agent, or Firm—Baker & Daniels

[57] ABSTRACT

A hermetic compressor including a plurality of shock mount units attached between the housing and a compressor unit disposed within the housing. Each shock mount unit includes a coil spring to damp vertical movement of the compressor unit with a U-shaped spring to damp horizontal movement of the compressor unit. The U-shaped spring is in sliding contact with a shock mount bracket attached between the coil spring and the housing, so that lateral oscillations of the compressor unit and sound transmission through the housing are reduced.

6 Claims, 2 Drawing Sheets

COMPRESSOR SHOCK ABSORBING MOUNT ASSEMBLY

BACKGROUND OF THE INVENTION

The invention relates to a hermetic reciprocating piston compressor, and in particular to a compressor having shock and vibration absorbing mounts that vertically suspend the compressor unit within its housing.

In most hermetic compressors, the motor compressor assembly is vertically supported within the housing by means of helical springs such that vibrations from the torque reaction caused by starting and stopping the compressor are absorbed by lateral deflection of the springs. Each of these springs is sufficiently stiff to withstand the lateral forces of the torque reaction while still being soft enough to provide vibration isolation. The springs deflect in a vertical direction to reduce vibrations transmitted to the compressor housing. The spring constant of each spring determines the amount of force transferred to the external connections of the compressor which is related to the sound transmitted out of the system.

Because of the necessity of controlling both vertical and horizontal motion, prior helical springs have been constructed with higher spring constants than would have been necessary if the helical springs were designed to only damp vertical vibrations. If the helical spring only had to damp vertical motion it could be made softer (i.e. with a lower spring constant) and therefore reduce sound transmission to the housing.

The problem with prior art spring mounting systems, such as that shown in U.S. Pat. No. 3,531,069 is that they do not adequately control the oscillations and sound transmittance of the motor compressor unit during starting and stopping, especially in large compressors. Sound transmittance is normally greater the larger the compressor. Horizontal oscillations about the shaft of the springs may result in over stressing and failure of the springs and other compressor components. The aforementioned prior art patent utilizes two helical springs to attempt to solve the sound transmittance problem and control horizontal displacement. An inner spring is used for controlling vertical movement while an outside larger, helical spring is used to control lateral displacement. A particular problem of this combination is of impact of the outside spring against the inner spring or mounting bracket during torsional movement accompanying the starting or stopping of the compressor. These impacts increase the noise transmitted through the compressor housing.

Also there is a certain horizontal displacement of the compressor where there is no damping of horizontal vibrations. The outside spring initially is not in contact with either the inner spring or mounting bracket therefore no damping takes place at compressor startup or shutdown.

Another prior art shock mount is disclosed in U.S. Pat. No. 1,988,295 which describes a yieldable supporting structure for use in eliminating vibratory motions of shock mount springs. This patent utilizes a helical spring to support a machine element with an overlying clip to reduce and dampen vibratory motions of the spring. The clip is attached to one of the machine members and biasedly contacts and overlies the helical spring. In this way, the force of the clip is used to reduce vibratory motions of the helical spring. A problem with this design is that by reducing the vibrations of the spring in this matter, the spring system may have a larger resultant spring constant, which would thereby transmit more energy to the compressor housing and correspondingly increase sound transmittance.

Another problem with the design of U.S. Pat. No. 1,988,295 is that lateral deflection of the shock mount is not as small as which could be achieved. The clip is in contact with the helical spring up until a point before where the spring meets the opposing support. Because the clip rides on the helical spring, there is a flexible object on which the clip may contact and which will not counteract the lateral deflection of the shock mount. Particularly, during lateral deflection of the shock mount, the shock mount will bend more at the location of the helical spring just beyond the end of the legs of the clip causing premature failure.

What is needed is a spring mounting system which dampens excessive horizontal oscillations and eliminates impact noise during starting and stopping. The spring mounting system must not utilize thicker springs, thereby not increasing transmission or there exists a need for a shock mount to withstand the higher horizontal vibrational forces encountered in larger compressors.

The present invention is directed to overcoming the aforementioned problems associated with prior shock mounts for use in larger compressors, wherein it is desired to utilize a helical spring for reduction of vertical vibrations and a formed flat spring for control of horizontal vibrations.

SUMMARY OF THE INVENTION

The present invention overcomes the problems and disadvantages of the prior art by providing an improved shock absorbing mount for controlling both vertical and horizontal vibrations, wherein a U-shaped, flat spring is oriented about a helical spring. In accordance with the apparatus of the present invention, a compressor having enhanced vibration damping and reduced sound transmittance characteristics is capable of being manufactured.

Generally, the invention provides a shock absorbing mount for a compressor in which a helical spring is utilized for control of vertical vibrations and for suspending the motor compressor unit within its housing. A U-shaped flat spring, with a lower spring constant, is oriented over the helical spring and in contact with a mounting bracket to produce a bias force against horizontal movement. Accordingly, any vibrations, in the vertical or horizontal plane relative to the mount, are damped by one or both springs.

More specifically, the invention provides that the U-shaped spring is oriented outside and about the helical spring with the legs of the U-shaped spring touching the sidewalls of a mounting bracket. The legs of the U-shaped spring are in sliding contact with the mounting during compressor start up and shut down, thereby reducing any potential impacts between the U-shaped spring and the mount.

An advantage of the shock absorbing mount of the present invention is that of increased sound suppression with reduction of the spring constant of the helical spring. The spring constant or stiffness of the helical spring may be lowered because the U-shaped flat spring is now utilized to absorb more of the lateral vibration forces. With this lowering of the spring constant of the helical spring, a lesser amount of vibration is propagated from the motor compressor to the housing.

Another advantage of the shock absorbing mount assembly of the present invention is that by including the U-shaped spring to damp lateral vibrations and movement of the motor compressor unit, the fatigue life of the helical springs and consequently the compressor is increased.

The invention, in one form thereof, provides a compressor having a motor compressor unit with a crankcase disposed within a housing. A shock mount bracket is attached to the housing while a plurality of shock mount units are attached between the bracket and the crankcase. Each shock mount unit includes a first spring to damp vertical movement of the compressor unit and second spring to damp horizontal movement of the compressor unit. The second spring is in sliding contact with the bracket so that lateral oscillations and sound transmission through the housing are reduced.

In the preferred embodiment, the first spring is a coil spring while the second spring is a flat spring formed into a U-shape.

The invention, in another form thereof, provides a vibration mount having a base member and a load member in which a first spring having a fixed end is rigidly connected to one of the base or load members, while the other end of the spring includes an open-end slidably engaging the other of the base or load member. A second spring is included having two ends, one end attached to each member, so that the second spring reduces axial movement. The first spring reduces lateral movement of the load member without substantially changing the axial damping effect of the second spring.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
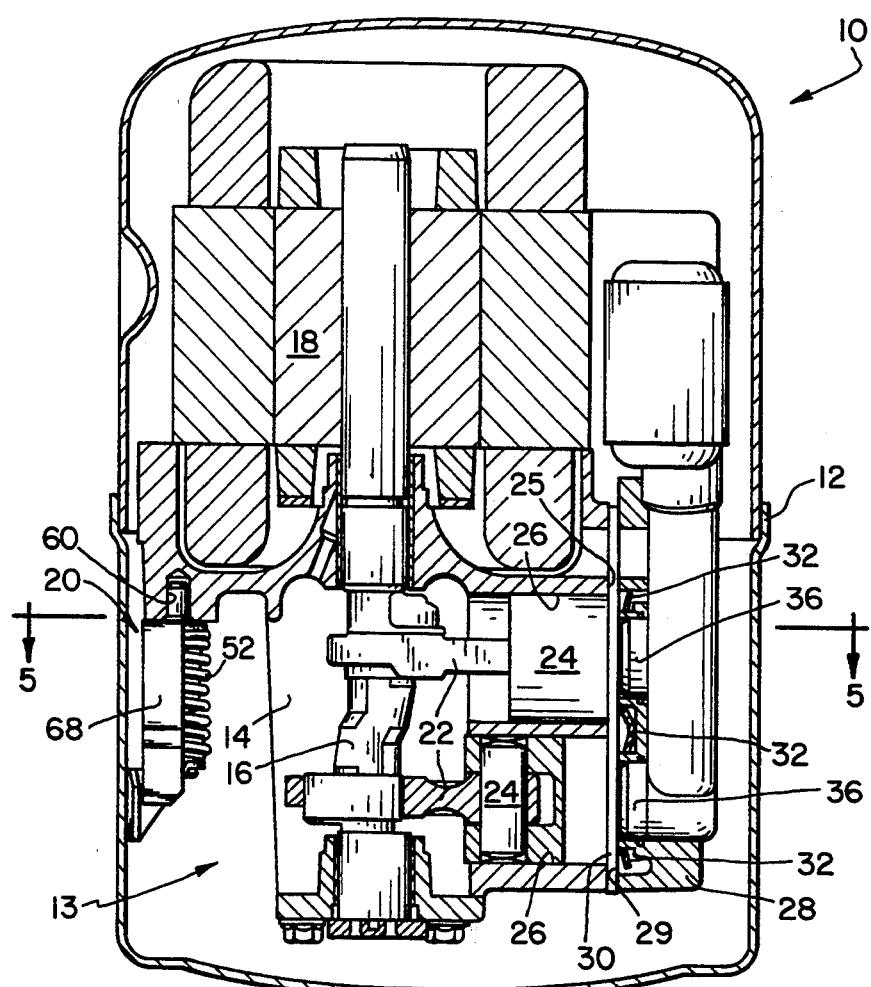
FIG. 1 is a longitudinal sectional view of a compressor of the type to which the present invention pertains.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to the drawings, and in particular to FIG. 1, there is shown a hermetically sealed, twin cylinder reciprocating piston compressor 10 of the type to which the present invention is applicable. Compressor 10 includes a sealed compressor housing 12 encapsulating the motor compressor unit 13. Disposed within housing 12 is a crankcase 14 supporting a crankshaft 16 which is driven by motor 18. Shock and vibration absorbing mounts 20 of the present invention attached to crankcase 14 and housing 12 suspend the compressor components within housing 12. Shock absorbing mounts 20 will be more thoroughly described later.

By way of illustration, and without limitation, orientation of compressor 10 in the illustrated preferred embodiment is with crankcase 14 suspended vertically below motor 18. Crankshaft 16 within crankcase 14 drives connecting rods 22, which are in turn connected to pistons 24 within cylinders 26. Cylinders 26 extend through a front surface 25 of crankcase 14.

A cylinder head 28 having a bottom surface 29 is assembled onto front surface 25 of crankcase 14 by means of bolts (not shown). A valve plate 30, to which suction and discharge valves (not shown) are mounted, is interposed between cylinder head 28 and crankcase 14. FIG. 1 shows discharge valve retainer 32 as is well known in the prior art.

Cylinder head 28 includes a discharge chamber 34 and suction chamber 36. During operation of compressor 10, the reciprocating action of pistons 24, together with discharge valves and suction valves mounted on valve plate 30, produce regions of discharge pressure and suction pressure in chambers 34 and 36, respectively.

Figure 2:
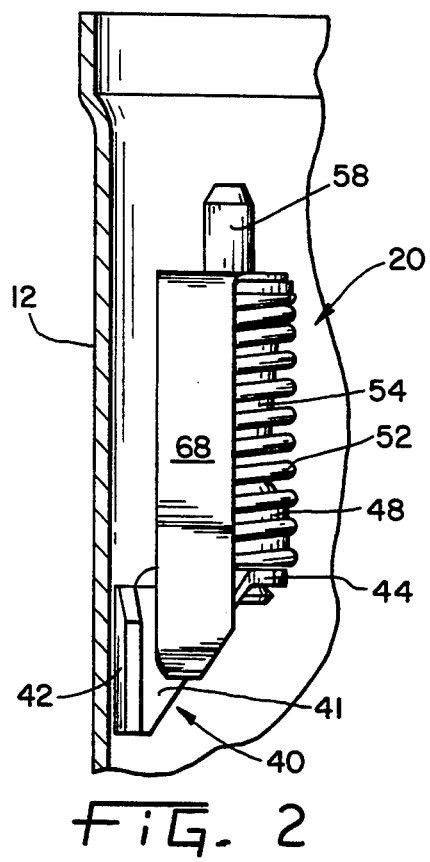
FIG. 2 is an enlarged sectional view of FIG. 1 focusing on the present invention.
Figure 3:
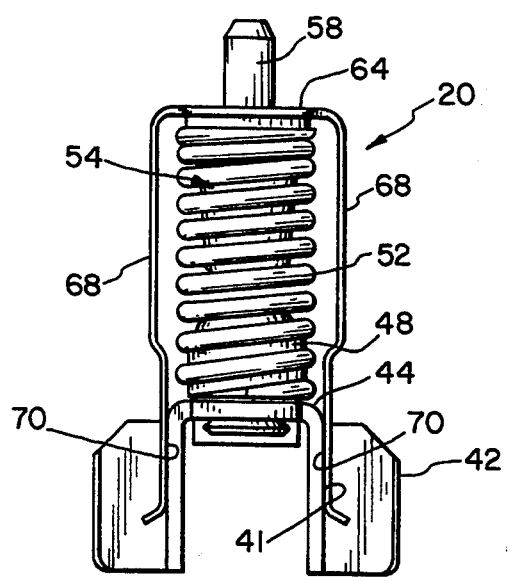
FIG. 3 is a front elevational view of the present invention.
Figure 4:
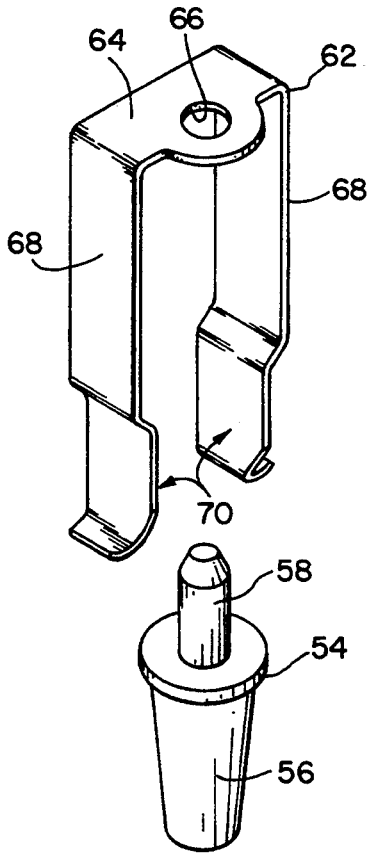
FIG. 4 is an exploded perspective view of the present invention.
Figure 4:
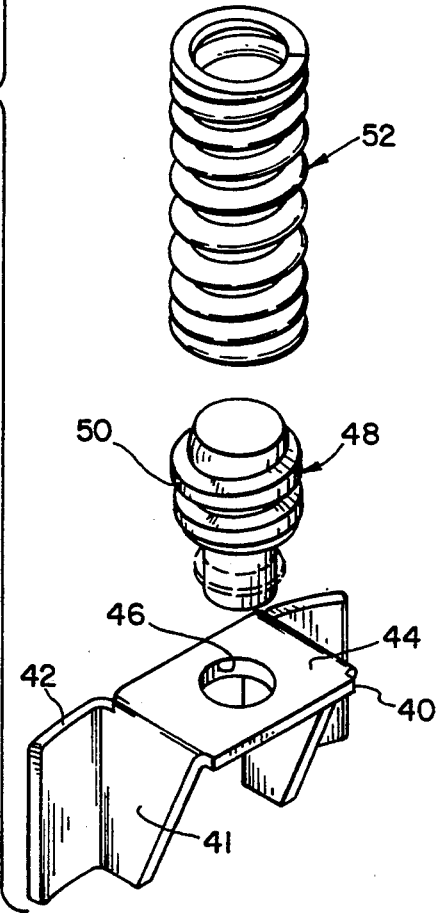

The present invention comprises an improved shock absorbing mount unit or assembly 20 as shown in FIGS. 2 - 4. Now referring particularly to FIG. 4 showing an exploded view of shock mount assembly 20, the system includes a shock mount bracket 40 to be attached by spot welding or other similar means to the side of compressor housing 12. Mounting bracket 40 includes a rounded side surface 42, corresponding to the shape of housing 12 for such attachment. Bracket 40 includes an upward facing top surface 44 having a hole 46 along with upstanding vertical portions or walls 41 connected to both side surface 42 and top surface 44. Alternatively, bracket 40 may be an integrally formed portion of housing 12. In that case, shock mount 20 would attach directly to housing 12.

Within hole 46 is mounted a lower spring stud 48 that is attached securely into mounting bracket 40. Spring stud 48 includes threads 50 for engagement of the vertically disposed load supporting helical spring 52. Helical spring 52 is of known construction and is threadably attached to lower spring stud 48 on threads 50.

An upper spring stud 54 is interfit within the top coils of helical spring 52. Specifically, upper spring stud 54 includes a lower tapered section 56 that is interfit within coils of helical spring 52. On upper spring stud 54 is an upstanding cylindrical protuberance 58. This protuberance 58 is used to locate and attach the shock mount assembly 20 to crankcase 14. Cylindrical protuberance 58 attaches into a suspension attachment connection such as a blind bore 60 in crankcase 14 (FIG. 1).

Lateral vibrations during compressor startup and shut down are controlled by a U-shaped flat spring 62 that is disposed over helical spring 52 as shown in FIG. 3. The base or center portion 64 of U-shaped spring 62 includes an opening 66 into which is interfit cylindrical protuberance 58 to thereby locate U-shaped spring 62 over the other components of shock mount assembly 20. Extending from two sides of the center portion 64 are legs 68 disposed in spaced relation with the coils of helical spring 52. Each leg 68 includes a bottom portion 70 for sliding contact with a vertical portion 41 of mounting bracket 40.

As shown in FIGS. 1, 2 and 3, bottom portion 70 contacts vertical portion 41 of mounting bracket 40. Legs 68 must be in sliding contact with vertical portions 41 of mounting bracket 40 during starting and stopping of the compressor. In its neutral state, shock mount assembly 20 is normally centrally located over mounting bracket 40 with the upper spring stud 54 in vertical alignment with lower spring stud 48.

During refrigerant system operation, compressor 10 will be started or stopped many times, thereby causing a torque reaction in the compressor. This causes crankcase 14 to turn or move horizontally within housing 12. The new mounting assembly 20 will control movement and reduce sound transmitted from motor compressor unit 13 to housing 12.

At this time, upper spring stud 54, connected by protuberance 58 to crankcase 14, will also move laterally and start to vibrate in a horizontal plane. The particular spring constant (stiffness and damping) selected for U-shaped spring 52 will cause a particular force to counteract the torque reaction of the motor compressor unit 13 thereby reducing the amplitude of horizontal vibrations and eventually moving crankcase 14 back into its normal position. Legs 68 of U-shaped spring 62 will slide against vertical portion 41 of mounting bracket 40 thereby counteracting the lateral torque reaction force at its start.

It is known to one in the art that the damping characteristics of the helical spring 52 and U-shaped flat spring 62 may be easily tuned by changing the spring material, thickness, length, and width of the legs and the number of coils per spring.

Figure 5:
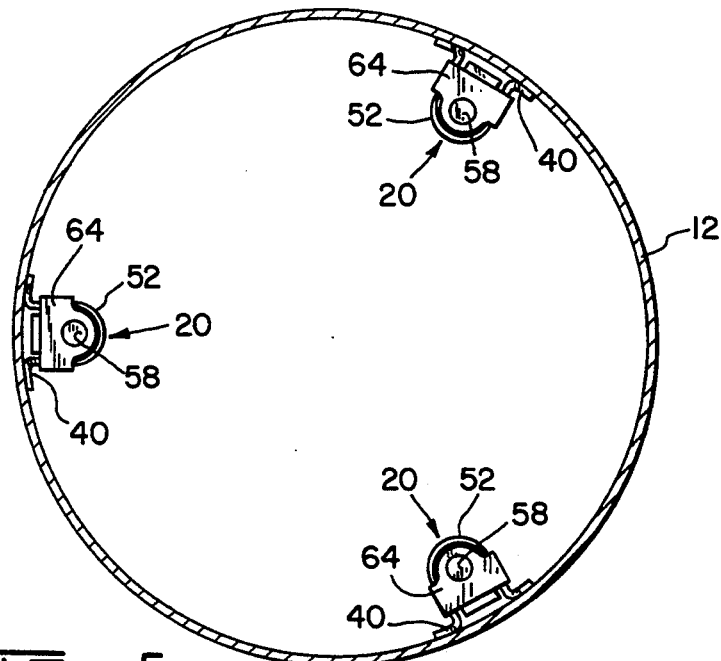
FIG. 5 is a partial sectional view of FIG. 1 taken along line 5—5 and viewed in the direction of the arrows showing the locations of the shock mounts of the present invention.

As shown in FIG. 5, the preferred use of shock mount assembly 20, within compressor 10, includes three such assemblies mounted equidistantly apart along the inner circumference of housing 12. This provides balance for the horizontal and vertical components of the loading forces created by the compressor while also equally distributing the forces onto housing 12.

As shown in FIG. 3, U-shaped spring 62 does not substantially reduce any vertical damping, this done by helical spring 52. During such vertical damping, as helical spring 52 oscillates in the vertical direction, U-shaped spring 62 will slide up and down along mounting bracket 40.

The new shock mount assembly 20 of the present invention permits a lowering of the spring constant of the helical support spring 52 over prior art use in compressors, since the helical spring is now not the only structural part to limit and reduce lateral torsional forces and oscillations. By reducing the spring constant of helical spring 52, the amount of vibration propagated from the motor compressor unit 13, through spring 52, to housing 12 is reduced.

In more general terms mounting bracket 40 may be considered the shock mount base member while crankcase 14 may be considered the load member of the system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressor comprising:
    a housing;
    a motor compressor unit disposed within said housing, said motor compressor unit including a crankcase;
    a shock mount bracket attached to said housing;
    a plurality of shock mount units attached between said bracket and said crankcase, each said shock mount unit including a coil spring to damp vertical movement of said motor compressor unit and a flat spring to damp horizontal movement of said compressor unit, said flat spring always in sliding contact with said bracket, whereby lateral oscillations and sound transmission through the housing are reduced.

2. The compressor of claim 1 in which said flat spring is U-shaped, and said coil spring is helical-shaped.

3. The compressor of claim 1 in which said second spring includes two legs that slide on opposite sides of said bracket.

4. A compressor comprising:
    a housing;
    a motor compressor unit disposed within said housing, said motor compressor unit having a suspension attachment connection;
    a mounting bracket attached to said housing;
    a coil spring having a first and second end, said first end attached to said mounting bracket;
    an attachment stud interfit on said spring second end, said stud including a cylindrical attachment portion facing away from said spring second end, said cylindrical attachment portion attached to said suspension attachment connection;
    a U-shaped spring having a base portion, said base portion having an opening, said attachment stud interfit through said base portion so that said U-shaped spring overfits said coil spring and slidably engages said mounting bracket.

5. The compressor of claim 4 in which said second spring includes two legs that slide on opposite sides of said bracket.

6. The compressor of claim 4 in which said suspension attachment connection is a blind bore within said motor compressor.

* * * * *